(12) United States Patent
Miller

(10) Patent No.: US 12,157,331 B1
(45) Date of Patent: Dec. 3, 2024

(54) NOTEBOOKS WITH REMOVABLE COMPONENTS

(71) Applicant: Miller IP Law, Ogden, UT (US)

(72) Inventor: Devin Miller, Morgan, UT (US)

(73) Assignee: Miller IP Law, Ogden, UT (US)

( * ) Notice: Subject to any disclaimer, the term of this patent is extended or adjusted under 35 U.S.C. 154(b) by 0 days.

(21) Appl. No.: 18/184,323

(22) Filed: Mar. 15, 2023

(51) Int. Cl.
| | |
|---|---|
| *B42F 13/00* | (2006.01) |
| *A47G 23/03* | (2006.01) |
| *A63F 3/00* | (2006.01) |
| *A63H 3/08* | (2006.01) |
| *B42F 3/00* | (2006.01) |
| *B43K 23/00* | (2006.01) |
| *B43L 1/00* | (2006.01) |
| *H04M 1/04* | (2006.01) |

(52) U.S. Cl.
CPC .......... *B42F 13/0013* (2013.01); *A47G 23/03* (2013.01); *A63F 3/00* (2013.01); *A63H 3/08* (2013.01); *B42F 3/00* (2013.01); *B43K 23/001* (2013.01); *B43L 1/00* (2013.01); *H04M 1/04* (2013.01)

(58) Field of Classification Search
CPC ........ B42F 13/0013; B42F 13/00; B42F 3/00; B43K 23/001; B43K 23/00
USPC ............. 281/15.1, 29, 31, 37; 402/4, 70, 73; 434/333, 406; 273/153 R, 156, 157 R
See application file for complete search history.

(56) References Cited

U.S. PATENT DOCUMENTS

| 3,972,764 | A | * | 8/1976 | Sendor | ................ | B29C 48/9145 412/17 |
| 5,683,112 | A | * | 11/1997 | McQueeny | ........... | A63F 9/1044 281/31 |

* cited by examiner

*Primary Examiner* — Justin V Lewis
(74) *Attorney, Agent, or Firm* — Miller IP Law; Devin Miller

(57) ABSTRACT

Described herein are examples of notebooks with removable components, comprising a front cover, a back cover, binding, and internal pages. The front cover and back cover are prepared from rigid or semi-rigid materials. The front cover comprises personalization space, and the front cover or back cover comprises a removable component. The removable component is separated from the front cover or back cover by an exterior edge and connected to the back cover by tabs. The exterior edge and tabs form a continuous perimeter around the removable component. The tabs are configured to be broken using average human finger strength allowing the removable component to be fully separated from the back cover.

19 Claims, 7 Drawing Sheets

NOTEBOOKS WITH REMOVABLE COMPONENTS

BACKGROUND

Notebooks have been a device for keeping personal and business records since the invention of paper. There are many known variations on notebooks for use in taking notes from the classic marble school notebook of youth to the gilded leather-bound tomes suitable for museums. Regardless of the size, shape and features, the general purpose of these notebooks is to provide a medium for recording notes, ideas, or any information worth memorializing.

BRIEF DESCRIPTION OF THE DRAWINGS

The present description will be understood more fully when viewed in conjunction with the accompanying drawings of various examples of notebooks with removable components. The description is not meant to limit the notebooks with removable components to the specific examples. Rather, the specific examples depicted and described are provided for explanation and understanding of notebooks with removable components. Throughout the description the drawings may be referred to as drawings, figures, and/or FIGs.

DETAILED DESCRIPTION

A notebook with removable components as disclosed herein will become better understood through a review of the following detailed description in conjunction with the figures. The detailed description and figures provide merely examples of the various embodiments of notebooks with removable components. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional notebook may include a front cover, a back cover, binding, and a series of pages located between the two covers. The pages can be blank, lined, colored, and/or contain pre-set formats such as graphs, item lists, charts, or other designs. Notebooks can be spiral bound or have standard hard bindings.

When considering existing notebooks, there is not currently a notebook that can be personalized for individuals or companies, which also has removable components that provide additional personalization and added features for the notebook. While personalization of stationary is known in the art, there is a lack of products that provide the ability to use handwritten notes accompanied by an additional removable component that can be used by the notetaker. More particularly, there is a lack of personalized notebooks the contain removable components that reinforce and/or highlight the personalization provided by the notebook.

Embodiments of notebook with removable components can be personalized in multiple manners. One embodiment can have a name, logo or image on the front cover, the back cover or both. Additional personalization of the notebook can be found in the form and nature of the removable component. Embodiments of the removable component can be related to the functions of the notebook, such as a pen holder for the notetaker or an easel for the notebook. Additionally, the removable component can be related to the personalization of the notebook, such as a name tag, key holder, key hanger, or ornament that contains the logo or name that has been personalized on the notebook.

The notebook with removable components provides personalization and brand recognition that is not readily available from stationary, notepads, notebooks or books currently available. The combination of personalization, brand recognition, and related removable components can provide increased marketing opportunities and improved customer relations for the provider of the notebook, as well as additional benefits for the notetaker. In alternate embodiments the removal component is not directly related to the personalization of the notebook 100 or the use of the notebook 100.

Figure 1:
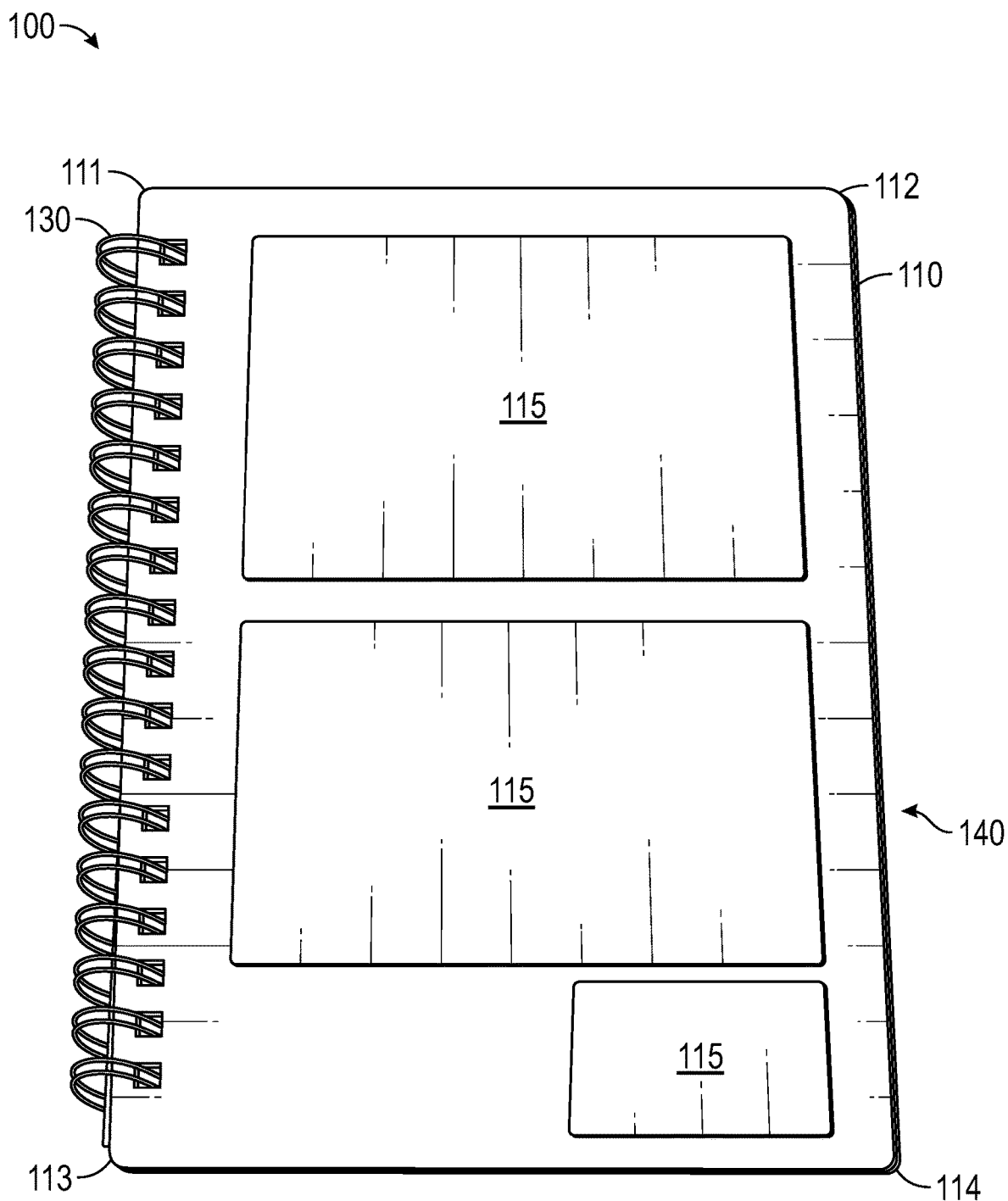
FIG. 1 illustrates a front view of a notebook with removable components according to an embodiment.

FIG. 1 illustrates a front view of a notebook 100, according to an embodiment. The notebook 100 includes a front cover 110, a back cover 120 (referred to herein as covers 110, 120), and binding 130. The notebook 100 includes personalization spaces 115 and internal pages 140. The covers 110, 120 can include corners, upper left corner 111, upper right corner 112, lower left corner 113, and lower right corner 114 (referred to herein as cover corners 111, 112, 113, and 114). The front cover 110 illustrated in FIG. 1 demonstrates the ability to place various personalization spaces 115 on the front cover 110 of the notebook 100. The personalization of the notebook 100 allows it to be used as a gift from a giver/distributor for marketing purpose, such as swag. Alternatively, the notebook can be a present from a friend or loved one, designed for personal use, or for internal company use.

Figure 2:
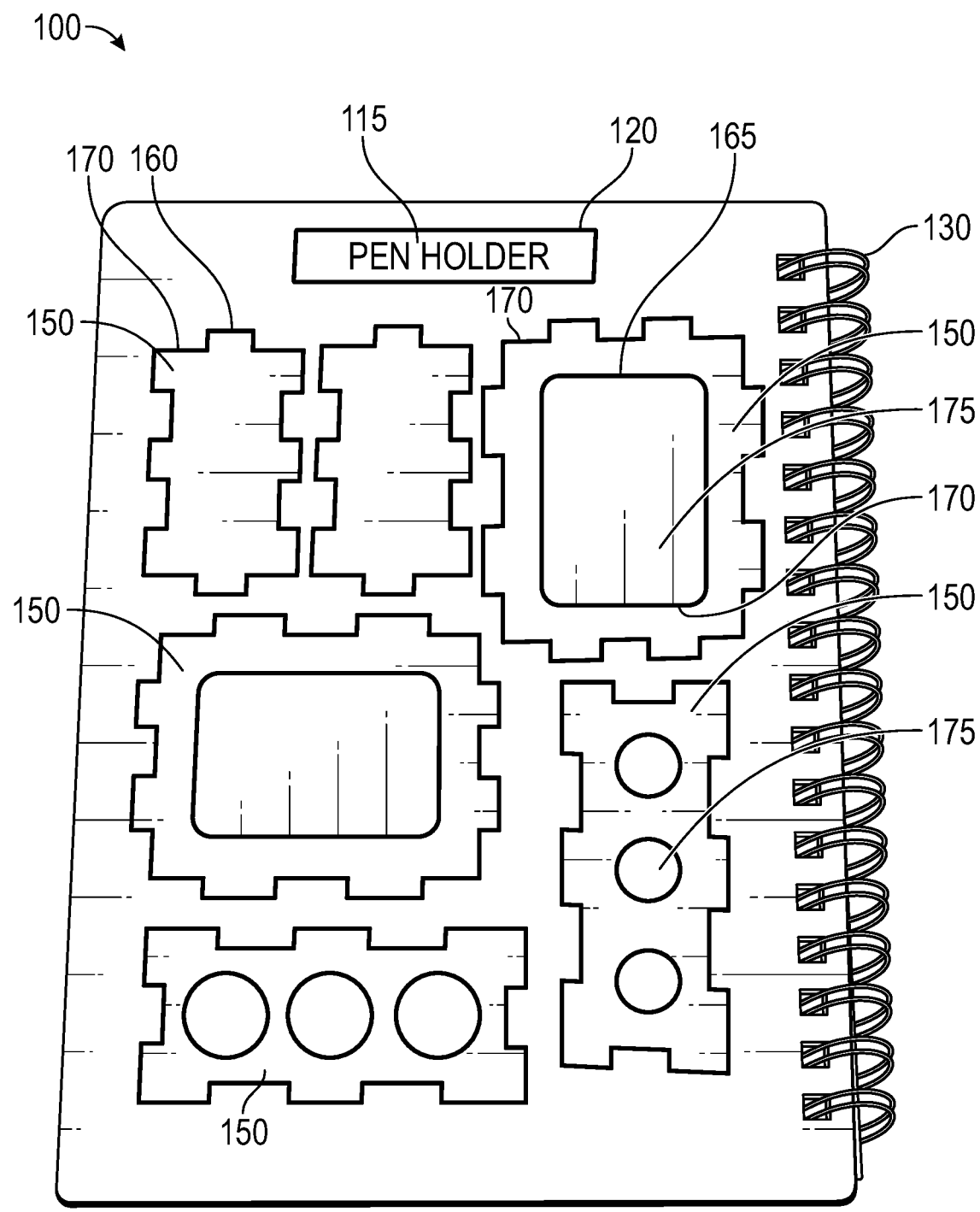
FIG. 2 illustrates a back view of a notebook with removable components according to an embodiment.

FIG. 2 illustrates a back view of a notebook 100, according to an embodiment. The notebook 100 includes a back cover 120, which includes removable components 150. The removable components include exterior edges 160, interior edges 165, tabs 170 and optionally filler components 175. The removable components 150 of the notebook 100, provide additional personalization and/or advantages for the notebook 100. FIG. 2 further illustrates the optional use of personalization space 115 on the back cover 120. The combination of the features shown in FIGS. 1 and 2 create a device that can be a gift, a promotional item, a marketing tool, and/or swag, that fulfills multiple purposes, needs or requirements simultaneously in a stylish, flexible, versatile and adaptable manner.

As illustrated in FIG. 1, the front cover 110 contains personalization spaces 115 for placing names, logos, images, words, markings or any types of designation chosen to provide personalization to the notebook 100. Personalization spaces 115 can also be included on the back cover 120. The personalization can be printed, engraved, stickered, or cut into the covers 110, 120 by laser cutting, press-cutting or other cutting methods suitable for the notebook 100. There can be multiple personalization spaces 115 on either the front cover 110 or the back cover 120. The personalization space 115 can occupy between 10-90%, preferably 20-80%, and most preferably 30-50% of the surface area of the covers, 110, 120.

In one embodiment of the notebook 100, the covers 110, 120 are prepared from a rigid or semi-rigid material. Examples of the rigid or semi-rigid materials include wood, such as balsa wood, basswood, plywood, soft woods, and so forth; plastics, such as acrylic materials, polymers, laminates, and so forth; metals, such as titanium, aluminum, tin, and so forth; styrofoam; ceramics; cardboard; or any rigid or semi-rigid material that is suitable for cutting, and will maintaining enough structural integrity to allow the removable components to remain in the cover 110, 120 until a user chooses to remove them, and not so rigid or strong that average human finger strength cannot break the tabs 170. Additional rigid or semi-rigid materials with be readily recognizable to a person of skill in the art. The use of rigid or semi-rigid materials for the front cover 110 and/or back cover 120 provides structural integrity to the removable component 150.

In one embodiment of the notebook 100, in which the covers 110, 120 are prepared from a plastic material, such as an acrylic or polymer material, the cover 110, 120 can be used as a reusable dry erase board with a non-permeant marker. In one embodiment, the cover 110, 120 contains a blank space, a space which does not contain any writing or removable components 150, that occupies between 20-80%, preferably 40-60% and most preferably 50% of the cover surface area. In certain embodiments, wherein the cover 110, 120 are plastic materials suitable as dry erase boards, both sides of the front cover 110 and both side of the back cover 120 can include a blank space to be used as a dry erase board.

In one embodiment of the notebook 100, the front cover 110 can be prepared from a different material than the back cover 120. Examples of alternate material for the front cover 110 are leather bound covers, vellum bound covers, and so forth. Alternatively, the front cover 110 can be a plastic material suitable for a dry erase board and the back cover can be prepared from a wood or metal material. Variations of cover materials can be employed to reflect the style and/or personalization chosen for the notebook 100.

In one embodiment the internal pages 140 can include standard paper, parchment, bond paper, matte coated paper, recycled paper, silk coated paper, construction paper, uncoated paper, watermarked paper, graph paper, or other type of writing material suitable for the notebook 100 and commonly employed in notebooks or other writing materials.

The removable components 150 are configured to be removed or separated from the covers 110, 120. In certain embodiments the removable component 150 is partially cut-out of the covers 110, 120. The removable component 150 can be partially cut-out of the covers by press cutting, laser cutting, die-cutting, or other techniques commonly employed in the industry to prepare cut-outs from solid surfaces. The removable components 150 are separated from the covers 110, 120 by the exterior edge 160 and connected to the covers 110, 120 by the tabs 170. The exterior edge 160 and the tabs 170 form a continuous perimeter around the removable components 150. The filler component 175 are formed in a similar manner to the removable component 150, the interior edge 165 and the tabs 170 are cut out of the cover 110, 120, and the interior edge 165 and the tabs 170 form a continuous perimeter around the filler component 175.

In one embodiment the removable component 150 is attached to the covers 110, 120 by tabs 170. The tabs 170 are created by the partial cut-out of the removable component 150 from the covers 110, 120. In one embodiment, the removable component 150 is partially cut-out and a series of cuts or perforations define the exterior edge 160 and the interior edge 165 of the removable component 150. The space created by the partial cut-out also defines the tabs 170 that continue to connect and link the removable component 150 and the covers 110, 120. The tabs 170 further connect and link the removable component 150 to the filler component 175.

After the removable component 150 is removed or separated from the cover 110, 120, the total perimeter of the removable component 150 is defined as a removed exterior edge 180. The tabs 170 allow the removable component 150 to remain a part of the covers 110, 120, until the removable component 150 is separated from the covers 110, 120. Additionally, the tabs 170 are configured to be broken to allow the removable component 150 to be removed or separated from the covers 110, 120. The tension or strength required to break the tabs 170 is within the average strength of human fingers, but not so easily broken that normal handling of the notebook 100 results in accidental breaking of the tabs 170 and separation of the removable component 150.

In one embodiment the total perimeter length of the tabs 170 and the exterior edge 160 of the removable component will be equal to 100% of the perimeter of the removed exterior edge 180. In certain embodiments the length of the tabs 170 is between 50-40% and the length of the exterior edge 160 is between 60-50% of the removed exterior edge 180. In alternate embodiments the length of the tabs 170 is between 30-40% and the length of the exterior edge 160 is between 70-60% of the removed exterior edge 180. In alternate embodiments the length of the tabs 170 is between 20-30% and the length of the exterior edge 160 is between 80-70% of the removed exterior edge 180. In alternate embodiments the length of the tabs 170 is between 10-20% and the length of the exterior edge 160 is between 90-80% of the removed exterior edge 180. In alternate embodiments the length of the tabs 170 is between 5-10% and the length of the exterior edge 160 is between 95-90% of the removed exterior edge 180. In alternate embodiments the length of the tabs 170 is between 2-5% and the length of the exterior edge 160 is between 98-95% of the removed exterior edge 180. In alternate embodiments the length of the tabs 170 is between 1-2% and the length of the exterior edge 160 is between 99-98% of the removed exterior edge 180. In alternate embodiments the length of the tabs 170 is 0.1-1% and the length of the exterior edge 160 is between 99.9-99% of the removed exterior edge 180.

The covers 110, 120 can be any shape that is usable as a cover for a notebook 100. Embodiments of the covers 110, 120 can be rectangular, square, triangular, polygonal, animal shaped, or circular. The covers 110, 120 can include cover corners, upper left cover corner 111, upper right cover corner 112, lower left cover corner 113, and lower right cover corner 114 (referred to herein as cover corners 111, 112, 113, and 114). The cover corners 111, 112, 113, and 114 can be right angles, rounded, tapered, or any shape used for notebook covers.

The binding 130 can be saddle binding, thermal binding, spiral binding, comb binding, velo-binding, tape binding, wire binding, perfect binding, hardcover binding, coil-binding, binder clip binding, or any or any type of binding used for notebooks. Suitable materials for the spiral, coil or clip binding include plastics, such as acrylic materials, polymers, laminates, and so forth; metals, such as titanium, aluminum, tin, and so forth or other materials suitable for these types of bindings.

In an alternate embodiment the removable components 150 can be returned to the cover 110, 120 and stored in the notebook 100 for later use or as a storage container. The removable component 150 can be configured to allow it to fit firmly back into the space from which it was removed. This can be accomplished by putting the removable component 150 back into the cover 110, 120 in a different confirmation from the original confirmation, through the use of re-usable tabs, a hook and loop mesh, re-useable adhesive polymers, or other components to re-insert the removable components 150 back into the covers 110, 120.

Figure 3:
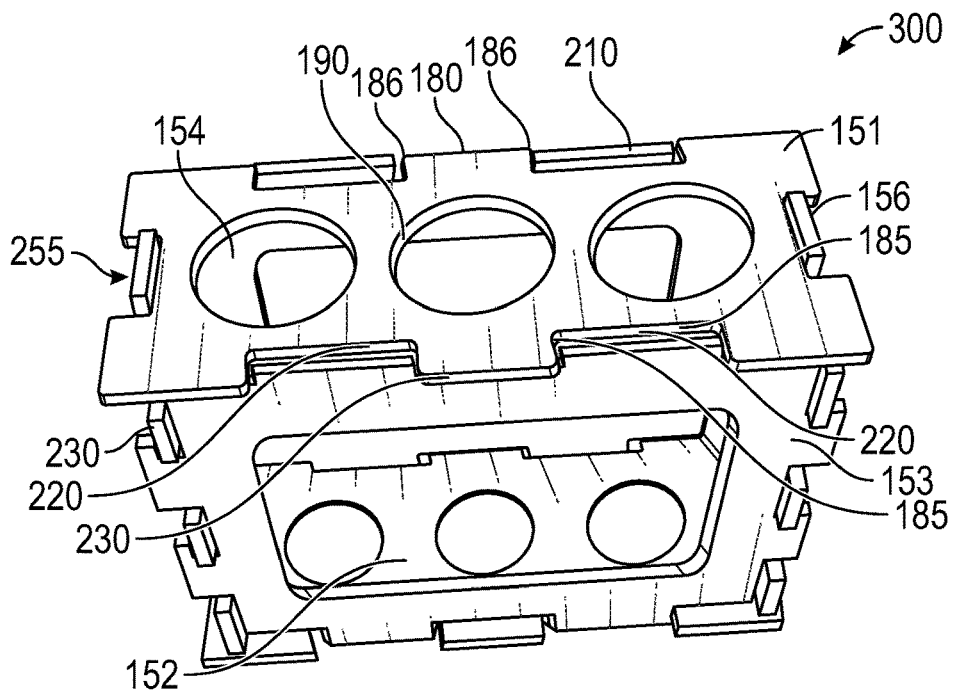
FIG. 3 illustrates a perspective view of a 3D pencil holder prepared from removable components of the notebook according to an embodiment.

FIG. 3 illustrates a three-dimensional (3D) product 300 prepared by assembling the removable components 150 of a notebook 100, according to an embodiment. The 3D product 300 illustrated in FIG. 3 is prepared from six removable components 151, 152, 153, 154, 155 and 156. More specifically, the 3D product 300 according to FIG. 3 is prepared from a top component 151, a bottom component 152, a front component 153, a back component 154, a left-side component 155, and a right-side component 156. The six removable components 151, 152, 153, 154, 155 and 156 are removed or separated from a cover 110, 120 as illustrated in FIG. 2. FIG. 3 illustrates an embodiment of the 3D product 300 that can be personalized to reflect the user of the notebook 100 and/or the giver/distributor of the notebook 100. The embodiment illustrated as 3D product 300 is a pen holder that provides a place for the user of the notebook 100 to store writing devices to be used to take notes in the notebook 100.

In the embodiment illustrated in FIG. 3, the perimeter of the removable component 150 includes a series of tails 220 and pins 230. The tail and pins shapes of the perimeter of the removable component 150 allow multiple removable components to be joined, combined or connected to form three-dimensional structures. The tails 220 are defined by the space between the pins 230. The tails 220 and pins 230 alternate around the perimeter of the removable component 150. The tails 220 and pins 230 are configured to form a joint 210 at a generally perpendicular or 90-degree angle. In the embodiment shown in FIG. 3, the tails 220 and pins 230 are generally equal in length. The tails 220 and pins 230 alternate one for one around the perimeter of the removed exterior edge 180 of the removable component 150. Interior corner edges 185 define the demarcation of the tails 220 and pins 230 along the removed exterior edge 180. With regard to the tails 220, the tail length is defined as the distance from a first interior corner edge 185 to a second interior corner edge 185. With regard to the pins 230, the pin length is defined as the distance from a first exterior corner edge 186 to a second exterior corner edge 186. The depth of the tails 220 and pins 230 are defined as the distance from the interior corner edge 185 to the exterior corner edge 186. In alternate embodiments the tails 220 are longer than the pins 230, but the depth of the tails 220 and pins 230 is generally equal.

As illustrated in FIG. 3 the six removable components 151, 152, 153, 154, 155 and 156 are configured to be joined in a system to form the 3D structure 300. FIG. 3 illustrates multiple joints 210 allowing the removable components to form a 3D structure to form the 3D product 300. The joint 210 illustrated in FIG. 3 is a box-joint in which the tails 220 and pins 230 are generally equal in shape, length and depth. Alternative joints, such as dove tail joints, with varying, shapes, lengths and depths of the tails 220 and pins 230 can be employed. In alternate embodiments the tails 220 and pins 230 can be triangular, polygonal, tapered, or any shape, length or depth commonly employed to join two or more rigid components as employed by skilled artisans such as woodworkers.

The 3D product 300 can be prepared from multiple removable components. In certain embodiments, the 3D product will be prepared from two removable components. As illustrated in FIG. 3, the 3D product can be prepared from six removable components. Alternate embodiments can include variations from 2 to 100 or more removable components. The limit of the number of removable components in determined by the available surface area of the covers 110, 120. Additional back covers 110, 120 can be employed to provide additional surface area for additional removable components 150.

The removable components 150 of the notebook 100 can be configured to be in any two-dimension (2D) shape. Additionally, the combination of removable components 150 can be joined to form a variety of three-dimensional (3D) shapes as shown by 3D product 300 in FIG. 3. Alternative 2D or 3D products can include, but are not limited to, coasters, key hangers, ornaments, shadow boxes, puzzles, name tags, phone holders, toys, board games with board game pieces, 3D logos, animal shapes, or any shape or structure suitable for 2D or 3D construction.

Figure 4:
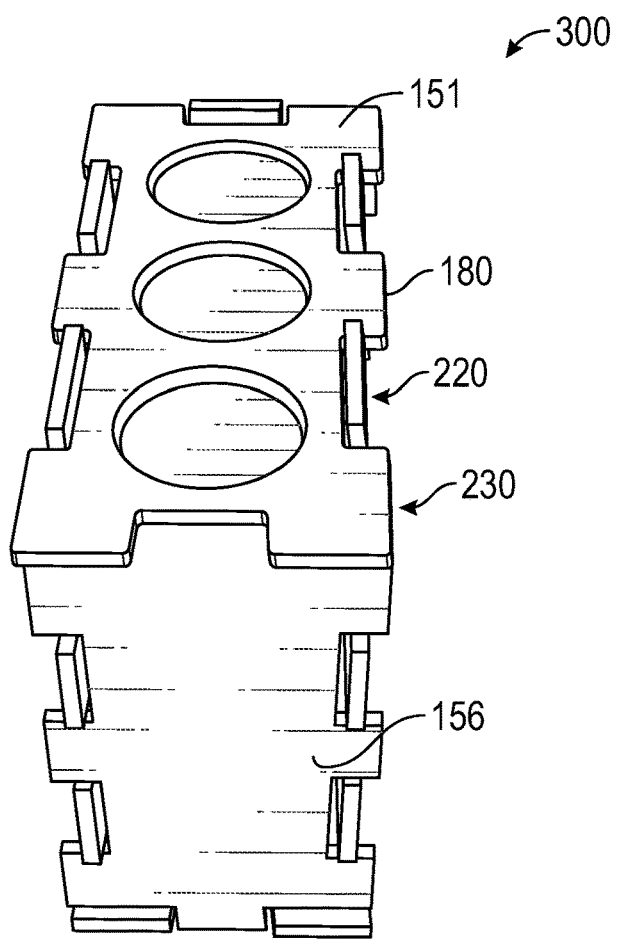
FIG. 4 illustrates an alternative perspective view of a 3D pencil holder prepared from removable components of the notebook according to an embodiment.

FIG. 4 illustrates a side view of the 3D product 300 prepared by assembling the removable components 150 of a notebook 100, according to an embodiment. FIG. 4 illustrates how the 3D product 300 can rest on its bottom component 152 in a 3D rectangular cuboid formation. The empty space formed by the removal of the filler components 175 allows the 3D product 300 to hold cylindrical objects including, but not limited to pens, pencils, and highlighters.

Figure 5:
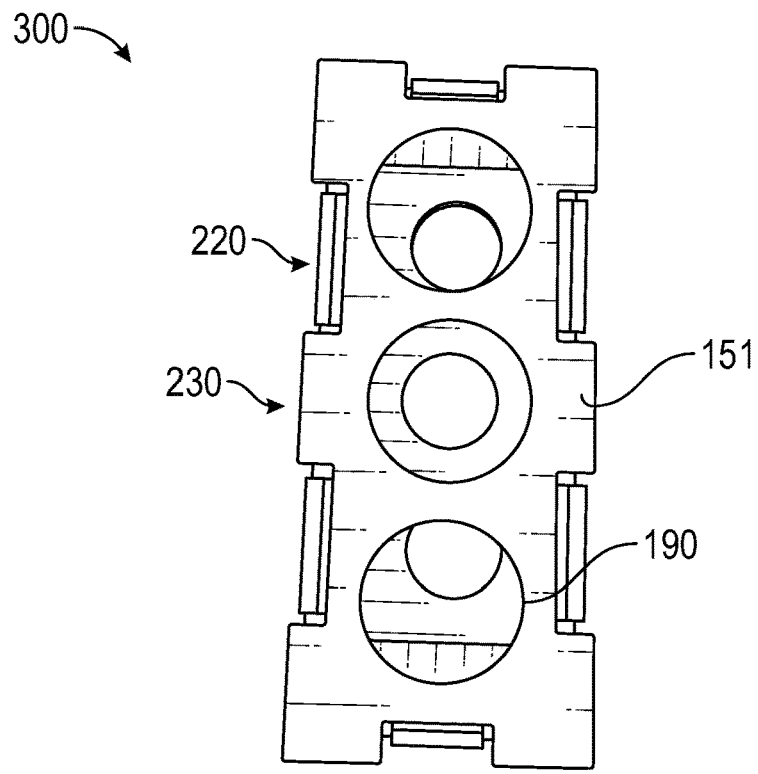
FIG. 5 illustrates an alternative perspective view of a 3D pencil holder prepared from removable components of the notebook according to an embodiment.

FIG. 5 illustrates a top view of the 3D product 300 prepared by assembling the removable components 150 of a notebook 100, according to an embodiment.

Figure 6:
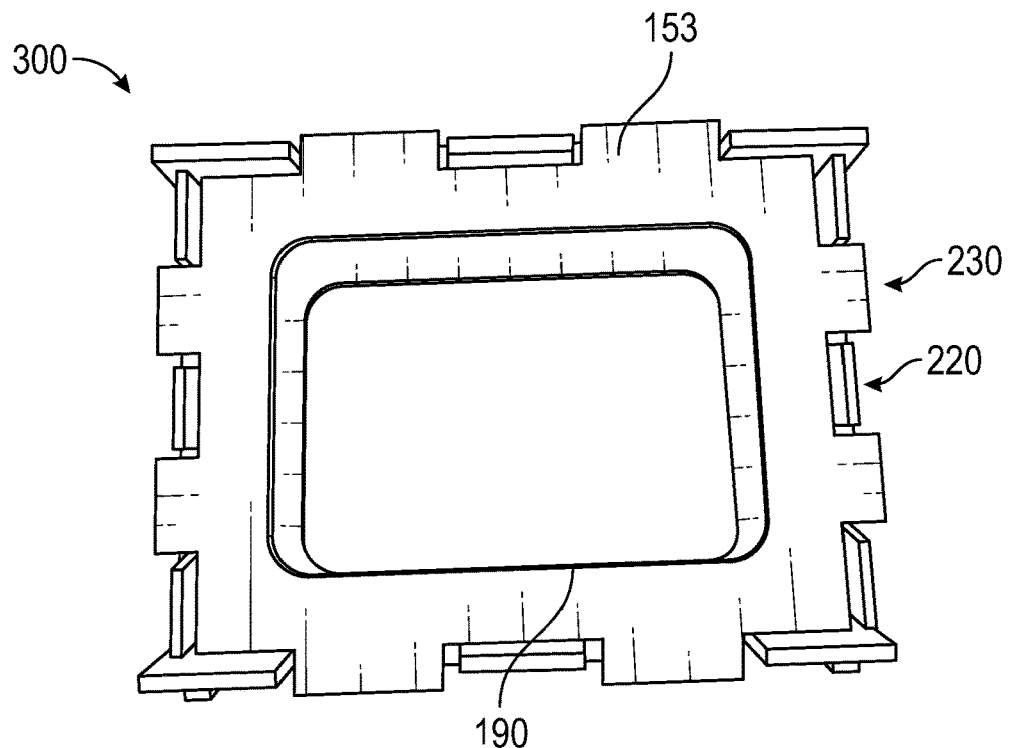
FIG. 6 illustrates a front-side view of a 3D pencil holder prepared from removable components of the notebook according to an embodiment.

FIG. 6 illustrates a front view of the 3D product 300 prepared by assembling the removable components 150 of a notebook 100, according to an embodiment. FIG. 6 illustrates the 3D product 300 resting on its back component 154 in a 3D rectangular cuboid formation. In an alternate embodiment, the filler component 175 is not removed, or not cut into the front component 153 or back component 154, and the space can used as a personalization space 115.

Figure 7:
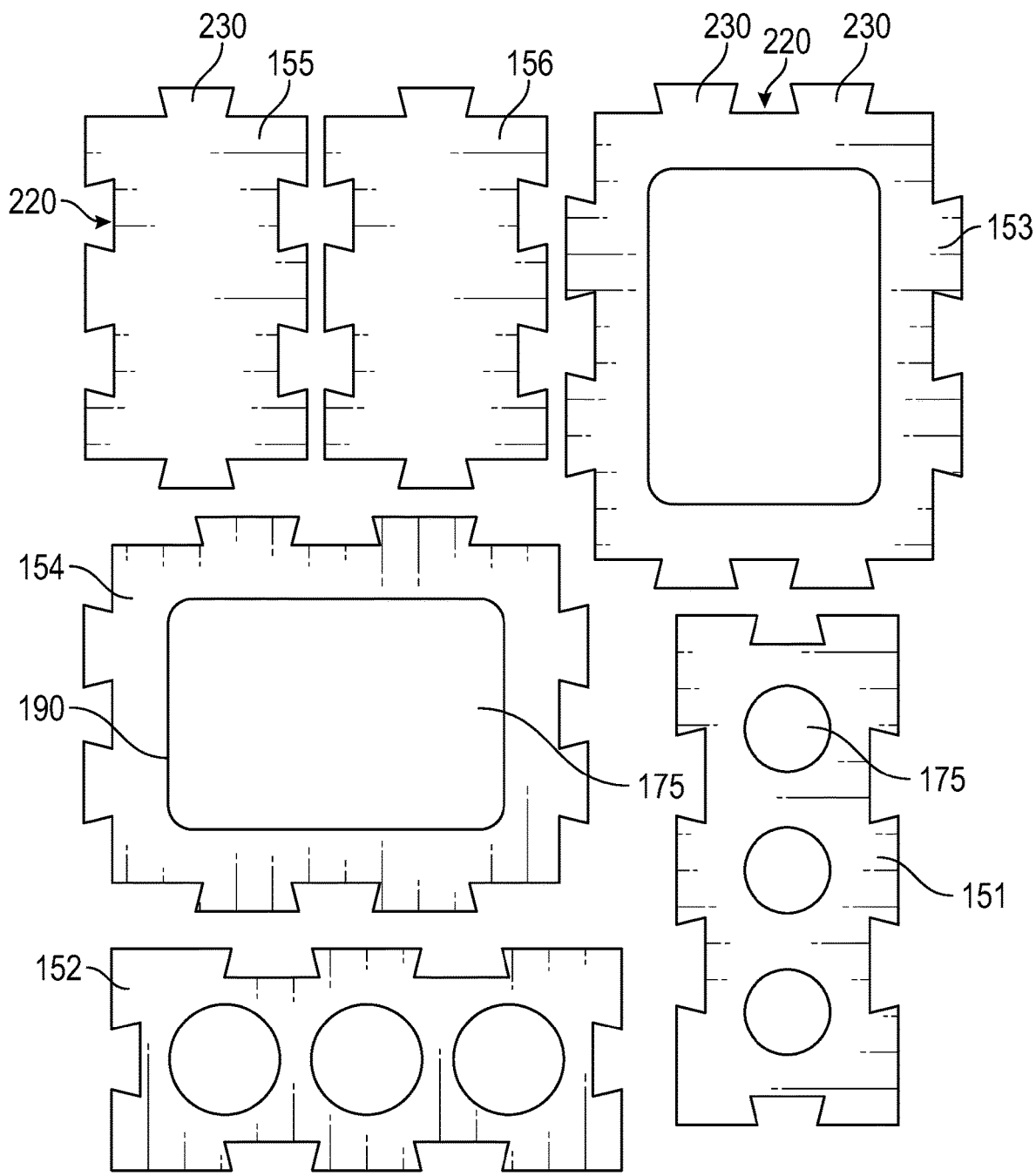
FIG. 7 illustrates an alternative back view of a notebook with removable components according to an embodiment.

FIG. 7 illustrates a pattern of removable components 150 that can be employed on covers 110, 120 of the notebook 100 to prepare an alternate 3D product 700, according to an embodiment, which is similar to 3D product 300, but with different shape tails 220 and pins 230 forming different joints 210. The tails 220 and pins 230 illustrated in FIG. 7 are generally equal in length and depth, but the shape of the tails 220 and pins 230 has been changed by increasing the angle at the interior corner edge 185 and decreasing the angle at the exterior corner edge 186. This formation allows for a dove-tail joint 310 linkage of the removable components 150. The dove-tail joint 310 will still be generally perpendicular and generally at a 90-degree angle, but the dove-tail nature of the joint 310 will provide greater stability for the 3D product 300.

Figure 8:
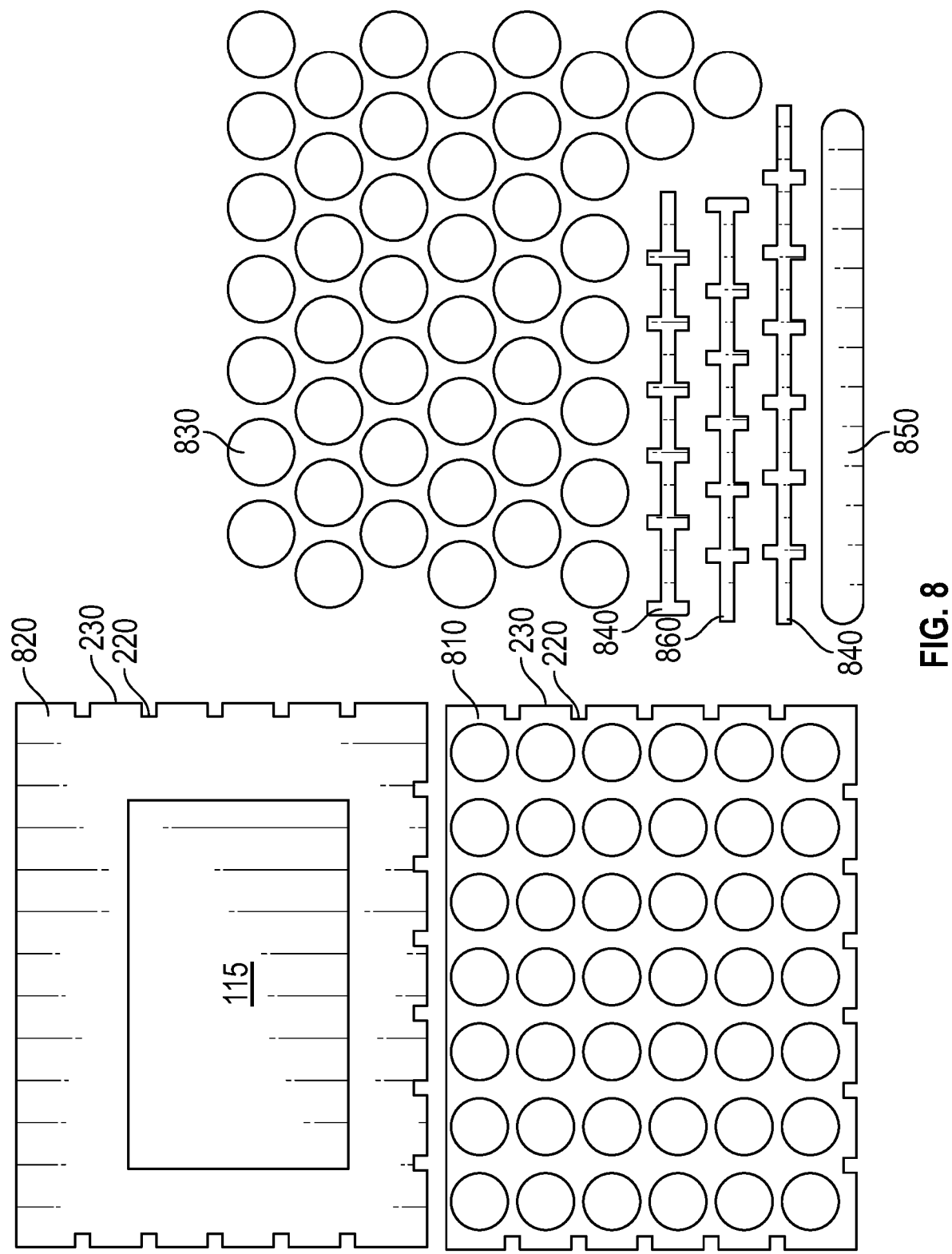
FIG. 8 illustrates an alternative back view of a notebook with removable components according to an embodiment.

FIG. 8 illustrates a pattern of removable components 150 that can be employed on covers 110, 120 of the notebook 100 to prepare an alternate 3D product 800, according to an embodiment. FIG. 8 illustrates removable components including a front board 810, a back board 820, multiple circular game pieces 830, frame legs 840, and frame floor 850. The back board 820 can include a personalization space 115. FIG. 8 illustrates a series of removable components that can be assembled to form a game including a hollow upright structure in which circular components are dropped into the hollow upright structure to form patterns. Games such as the one shown in FIG. 8 provide increased personalization and benefits to the notebook 100.

As illustrated in FIG. 8 the removable components 810, 820, 830, 840 and 850 include exterior edges 160 and tabs 170 similar to the removable components shown in FIG. 2. This allows the removable components to be easily removed from the cover 110, 120, but provide enough support to maintain the structure of the covers 110, 120 until a user chooses to remove them from the notebook 100. Further, the removable components 810, 820, and 840 are configured in a box-joint type style, similar to the tail 220 and pin 230 configuration shown in FIG. 2, except that the pins 230 are shorter in length than the tails 220 in the embodiment in FIG. 8. The removable components 830 (circular game pieces) and 850 (frame floor) are configured to be used with the 3D product 800 shown in FIG. 8. Markings, symbols, letters, colors, or other identifying features can be included on circular game pieces 830 to create two or more separately identifiable sets of game pieces.

Additional games, including game boards/structures and game pieces can be constructed in accordance with the removable components of the notebook 100. Examples, include, but are not limited to chess, checkers, backgammon, mahjong, and dominoes. The removable pieces of the notebook 100 can be adapted to prepare various games based on the teachings of the present application.

Figure 9:
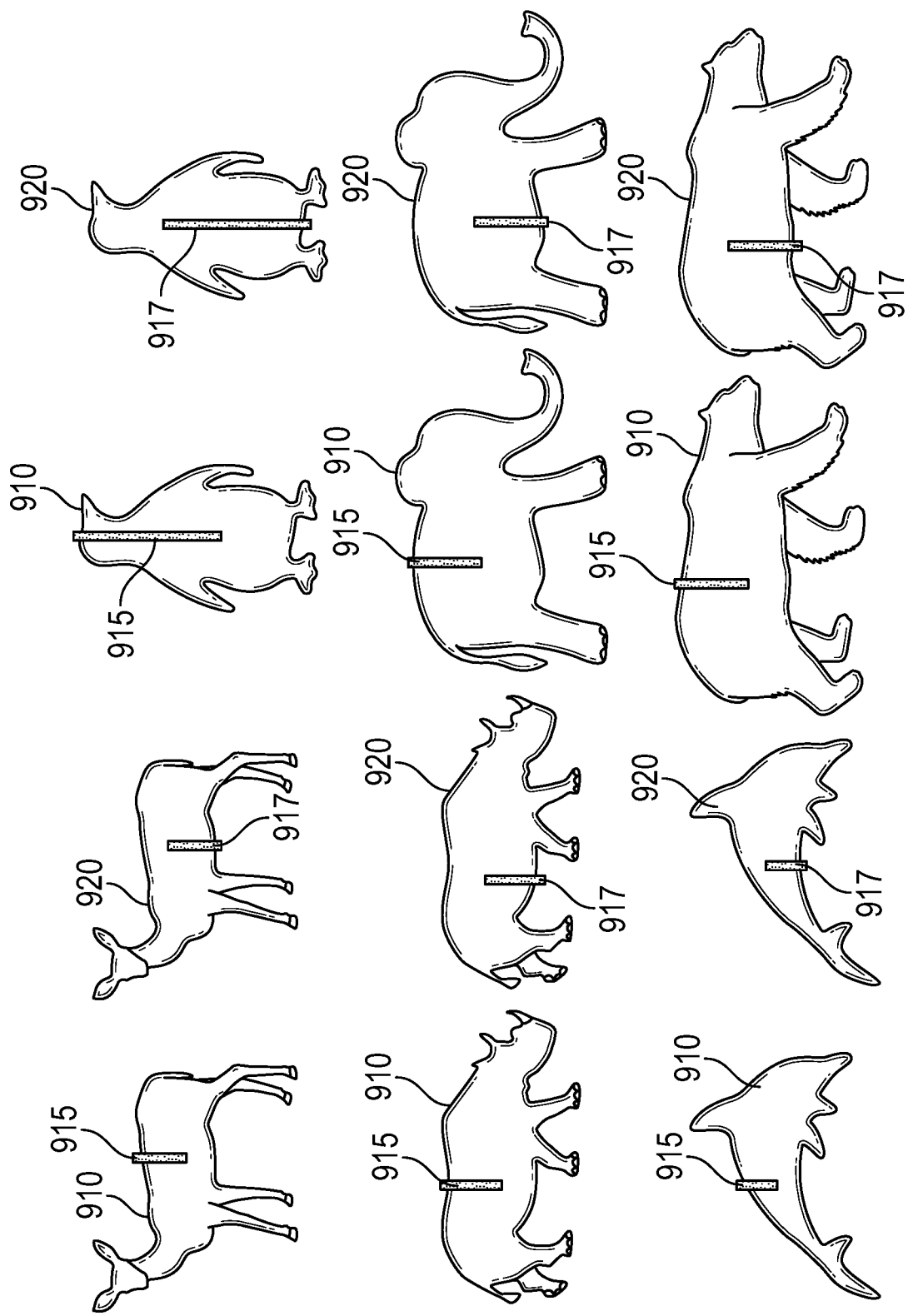
FIG. 9 illustrates an alternative back view of a notebook with removable components according to an embodiment.

FIG. 9 illustrates a pattern of removable components in various animal shapes that can be employed with the cover 110, 120 of the notebook 100, in an embodiment. The animals have a first animal shape 910, with an upper slot 915 cut into first animal shape 910, and second animal shape 920, with a lower slot 917 cut into second animal shape 920. The animal shapes 910, 920 provide 3D upright structures that can be used as toys or game pieces in accordance with the notebook 100. The use of different types of animals, or alternate shapes, provides additional personalization and benefits of the notebook 100.

As illustrated in FIG. 9, with the exception of the slots 915, 917, the individual animal shape 910, 920 is identical (e.g., they are identical images of a deer, penguin, rhinoceros, elephant, dolphin, bear, or any other type of animal). After the identical animal shapes 910, 920 are removed from the notebook 100, they can be slotted into the identical animal shape, with animal shape 920 being placed over and then down into animal shape 910, forming a horizontal "X" that allows the combined animal shapes to support themselves in an upright manner.

As illustrated in FIG. 9, the removable components 910, 920 are in the shape of animals, and the first animal shape removable component 910 includes a vertical slot 915 cut into a top of the first animal shape removable component 910, and the second animal shape removable component 920 includes a vertical slot 917 cut into a bottom of the second animal shape removable component 920. This configuration allows the first and second animal shape components 910, 920 to be joined or linked to form a three-dimensional product.

The shapes that can be employed with the notebook 100 are not limited to animal shapes. There can be squares, triangles, rectangles, polygons, or any suitable two-dimensional shapes. Additionally, the shapes can be configured as logos, names, images, or any type of shape that will provide personalization or utility.

An additional use of the notebook 100 in accordance with the configuration of animals shown in FIG. 9, is as a stencil. Once the animal shapes 910, 920 have been removed from cover 110, 120, the empty space can be used as a stencil in which a user can draw an outline of the animal shape 910, 920 onto a piece of paper or other material, by following the outline created by the removal of animal shape 910, 920. The shape of the stencil will be whatever the shape of the removed component had been, therefore, the stencil can be for any shape chosen for the removable components 150 of the notebook 100.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. An apparatus, comprising:
   a front cover, a back cover, binding, and internal pages,
      wherein the front cover and back cover are prepared from a rigid or semi-rigid material selected from plastic or wood, wherein the front cover comprises personalization space, wherein the personalization space comprises 20-80% of the front cover, and the back cover comprises removable components;
      wherein the removable components are separated from the back cover by an exterior edge and connected to the back cover by tabs, wherein the exterior edge and tabs form a continuous perimeter around the removable components, and wherein the exterior edge is laser cut or press-cut;
      wherein the tabs are configured to be broken allowing the removable components to be fully separated from the back cover;
      the removable components further comprising a perimeter comprising alternating tails and pins, wherein the tails and pins are configured to allow multiple removable components with tail and pin perimeters to be joined to form a three-dimensional product;
      wherein the binding is selected from the group consisting of saddle binding, thermal binding, spiral binding, comb binding, velo-binding, tape binding, wire binding, perfect binding, hardcover binding, coil-binding, or binder clip binding; and
      wherein the removable components further comprise a filler component and an interior edge, wherein the filler component is separated from the removable components by the interior edge and connected to the removable components by tabs, and wherein the interior edge and tabs form a continuous perimeter around the filler component, and wherein the interior edge is laser cut or press-cut.

2. The apparatus of claim 1, wherein the back cover comprises personalization spaces, and the personalization space is printed by laser cutting or press-cutting.

3. The apparatus of claim 1, wherein the front cover is a plastic material suitable as a dry erase board.

4. The apparatus of claim 1, wherein the three-dimensional product is prepared from at least six removable components and the three-dimensional product is a pen holder.

5. The apparatus of claim 1, wherein the three-dimensional product is prepared from at least four removable components and the three-dimensional product is a phone holder or a key holder.

6. The apparatus of claim 1, wherein the tails and pins around the perimeter of the removable components are square and equal in length and depth.

7. The apparatus of claim 1, wherein the tails and pins around the perimeter of the removable components are polygonal, tapered, and equal in length and depth.

8. The apparatus of claim 1, wherein the removable components are configured to form a board game with game pieces.

9. An apparatus, comprising:
   a front cover, a back cover, binding, and internal pages, wherein the front cover and back cover are prepared from a rigid or semi-rigid material, wherein the front cover comprises personalization spaces, and the back cover comprises removable components;
   wherein the removable components are separated from the back cover by an exterior edge and connected to the back cover by tabs, wherein the exterior edge and tabs form a continuous perimeter around the removable components, and wherein the exterior edge is laser cut or press-cut;
   wherein the tabs are configured to be broken allowing the removable components to be separated from the back cover;
   wherein a first removable component comprises a vertical slot cut into a top of the first removable component, and a second removable component comprises a vertical slot cut into a bottom of the second removable component, wherein said first and second removable components are configured to be joined by linking the two vertical slots and forming a three-dimensional product; and
   wherein the first removable component further comprises a filler component and an interior edge, wherein the filler component is separated from the first removable component by the interior edge and connected to the removable components by a tab.

10. The apparatus of claim 9, wherein the first removable component and the second removable component are in a shape of an animal.

11. The apparatus of claim 9, wherein the first removable component and the second removable component are in a shape of logo.

12. The apparatus of claim 9, wherein a total perimeter of the tabs and the exterior edge of the removable components is a removed exterior edge, and wherein a length of the tabs is between 20-30% and a length of the exterior edge is between 80-70% of the removed exterior edge.

13. The apparatus of claim 9, wherein a total perimeter of the tabs and the exterior edge of the removable components is a removed exterior edge, and wherein a length of the tabs is between 10-20% and a length of the exterior edge is between 80-90% of the removed exterior edge.

14. The apparatus of claim 9, wherein a total perimeter of the tabs and the exterior edge of the removable components is a removed exterior edge, and wherein a length of the tabs is between 2-5% and a length of the exterior edge is between 95-98% of the removed exterior edge.

15. An apparatus, comprising:
   a front cover, a back cover, binding, and internal pages, wherein the front cover and back cover are rigid or semi-rigid materials;
   wherein the front cover comprises personalization space, and the back cover or front cover comprises a removable component;
   the removable component is separated from the back cover or front cover by an exterior edge and connected to the back cover or front cover by tabs, wherein the exterior edge and tabs form a continuous perimeter around the removable component;
   wherein the tabs are configured to be broken allowing the removable component to be separated from the back cover; and
   wherein the removable component further comprises a filler component, wherein the filler component is separated from the removable components by a tab.

16. The apparatus of claim 15, wherein a total perimeter of the tabs and the exterior edge of the removable component is a removed exterior edge, and wherein a length of the tabs is between 2-5% and a length of the exterior edge is between 95-98% of the removed exterior edge.

17. The apparatus of claim 16, wherein the personalization space is printed by laser cutting or press-cutting.

18. The apparatus of claim 16, wherein the removable component is a coaster.

19. The apparatus of claim 16, wherein the removable component is a logo.

* * * * *